W. GAGE.
Harvester.
No. 3,128. Reissued Sept. 22, 1868.
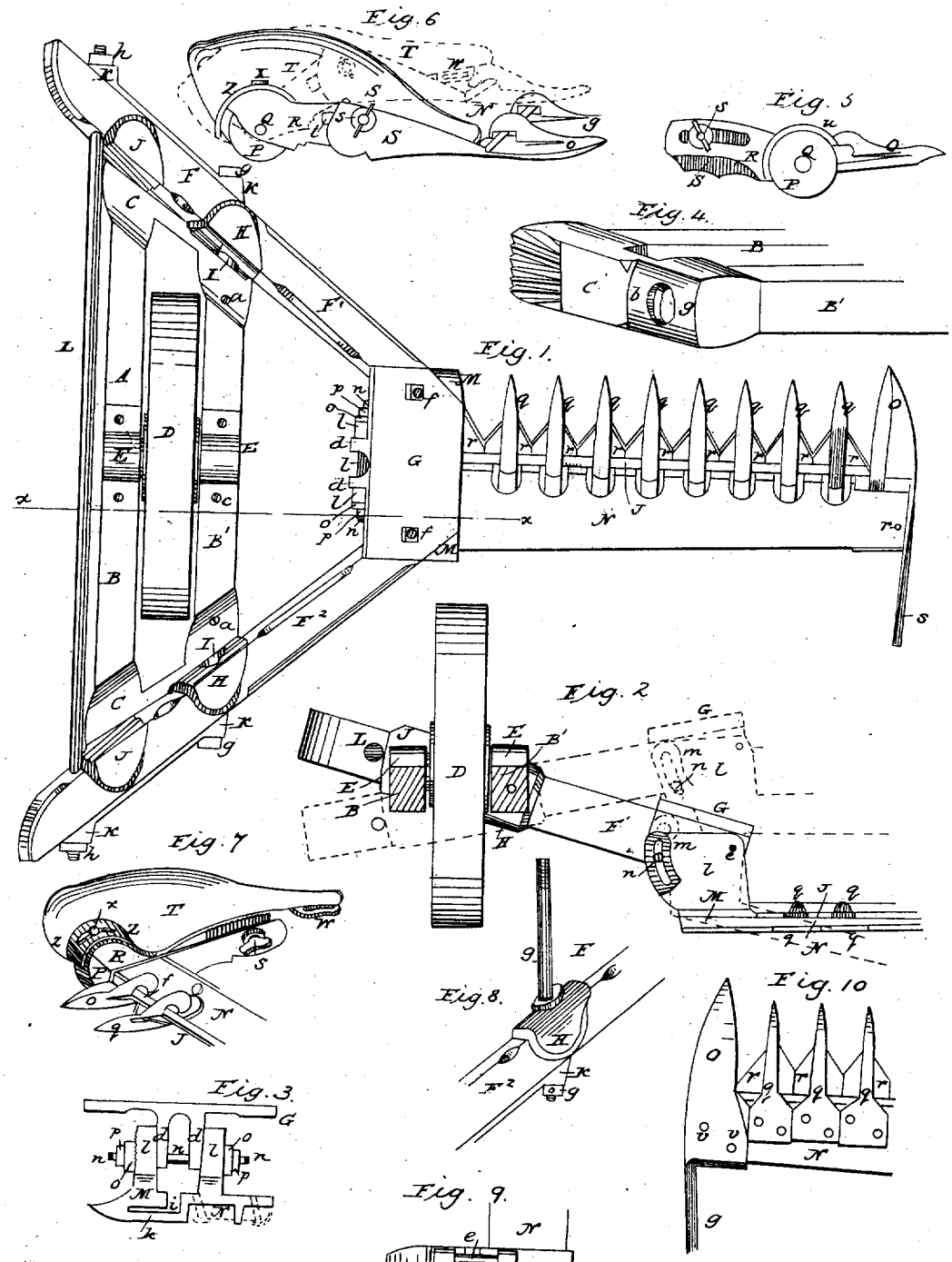
Attest:
Thos. A. Connolly
J. S. Brown.
Inventors
W. Gage
Andrew H. Kelly
per R. O. Smith Atty
N. PETERS. Photo-Lithographer, Washington, D. C.

UNITED STATES PATENT OFFICE.

WILLIAM GAGE, OF BUFFALO, NEW YORK, AND ANDREW WHITELEY, OF SPRINGFIELD, OHIO, ASSIGNEES OF WILLIAM GAGE.

IMPROVEMENT IN HARVESTERS.

Specification forming part of Letters Patent No. 15,735, dated September 16, 1856; Reissue No. 3,128, dated September 22, 1868.

DIVISION F.

*To all whom it may concern:*

Be it known that WILLIAM GAGE, of the city of Buffalo, in the county of Erie and State of New York, did invent new and useful Improvements in Harvesters; and we do hereby declare the following to be a full, clear, and exact description of so much of said invention as is claimed in this patent, reference being had to the annexed drawings, in which—

Figure 1 is a plan view of the machine with the outer grain or grass wheel and track-clearer removed, showing the cutters in their inner reciprocation. Fig. 2 is a rear elevation on line *x x*. Fig. 3 is a side elevation of the shoe M and plate G, to which said shoe is pivoted, and which forms a part of the coupling or supplementary frame. Fig. 4 is a view of one end of the main frame. Fig. 5 is a view of the outer end of the finger-bar, showing the carrying grain or grass wheel, and its connecting-arm reversed, and outside of the end of the finger-bar, the track-clearer being removed. Fig. 6 shows, in black, the outer end of the finger-bar, carrying-wheel, and track-clearer in position for mowing; and in red, the outer end of the cutting apparatus raised for reaping, the front end of the track-clearer being raised above the finger-bar to show the slot. Fig. 7 is a perspective view of the outer end of the finger-bar, with the carrying-wheel and track-clearer reversed. Fig. 8 is a plan view of a section of the rear branch of the coupling or supplementary frame, showing the tubular pivot I and joint-bolt *g* detached from the main frame. Fig. 9 is a top view of shoe M. Fig. 10 is a bottom plan of a portion of the cutting apparatus.

That end of the finger-bar which is connected to the shoe and terminates at its inner edge, as shown in Fig. 2, we call its "inner end," and that end to which the divider is connected we call the "outer end." That end of the coupling-arm or supplementary frame which is nearest the cutter-driving wheel, and is hinged to the outer side of the main frame, we call its "inner end," and that end to which the shoe M is hinged we call the "outer end."

The same letters designate the same parts in all the figures of the drawing.

The cutting apparatus of the harvester is one of the most important parts, as without a good cutting apparatus no harvester can be made to work well. This is particularly the case when the machine is for mowing, as the cutting apparatus and the cutter-driving mechanism then constitute its main parts.

In constructing the harvester for reaping only but little attention was formerly paid to secure the cutting of the crop by the different parts of the cutter at a uniform distance from the ground, because the cutting of a part of it one, two, or three inches farther from the ground than another part caused no appreciable loss, and the cutting of the crop too close to the ground was one of the main objections urged against the reaping-machines. On the other hand, great objection was made to the mowing-machines on account of the grass being cut too far from the ground, and particularly because the cutters of one portion of the apparatus severed the grass at a greater distance from the ground than the cutters of another portion. A great loss in the crop cut by the mowing-machine was sustained in consequence of these defects in the cutting apparatus.

The production of a harvesting-machine which would both cut the grass well, as had been done before, and cut all parts of it at a distance from the ground as uniform as it could be cut with a cutting apparatus having a stiff finger-bar, and particularly to so cut it upon undulating surfaces, was the object designed to be accomplished by that part of the invention included in this patent.

Experience previous to this invention had demonstrated that the best cutting apparatus for harvesters was that one having the sections of the cutter rigidly secured to the cutter-bar, and reciprocated across the shoe, fingers, and divider, and through their slots in straight lines; and experience had also shown that the finger-bar of a mowing-machine should have no other connection with the frame of the machine to which the shoe was connected than the connection derived through said shoe, and that the parts of the shoe, fingers, and divider below and above the cutters, and which

BEST AVAILABLE COPY hold the crop while being severed, should be nearly at right angles to the front edge of the finger-bar, and each of said parts above and below the cutters extending about the same distance laterally, so as to support the crop equally above and below the cutting-edge while being severed. For these reasons the improvement contained in this patent was made upon this kind of cutting apparatus and its connection to said frame, so that this good cutting apparatus might cut all parts of the grass, and particularly that upon undulating surfaces, at a more uniform distance from the ground than it had previously been enabled to do.

That part of this invention claimed in this patent will be understood by the following description of the construction and operation of its parts.

A is the main frame of the machine, composed of two side pieces, B and B′, of wood, and the two cast parts C C, each having two hollow projections, into which the ends of B and B′ are inserted, as shown in Fig. 1. Those which encompass the ends of B′ are secured thereto by the screw-bolts *a a*. Through each of the outer ends of the castings C C, as shown in Fig. 4, is made a large hole, *b*, and in outward projections at the inner end of each of these castings C C are formed serrations radiating from the center line of holes *b b*.

D is the cutter's driving-wheel, which also supports the main frame. E is the axle of this wheel, and is connected to the main frame A by the boxes *c c*.

For the reason that the improvement contained in the cutting apparatus, by combining with the finger-bar N thereof the shoe M and narrow divider O, is the first and controlling element of that part of the invention herein claimed, we will describe the construction of said shoe and narrow divider, and their connection by the finger-bar, before describing the construction and connections of the coupling-frame between this cutting apparatus and the main frame.

M is the shoe, at the inner end of and forming part of the cutting apparatus. The finger-bar N, forming another part thereof, has no other connection with the frame of the machine to which the shoe is connected than the connection which is derived through said shoe. This shoe M, besides thus sustaining the finger-bar, is constructed with the guideway *i*, to guide the cutter-bar *j*, to which the several sections of the cutter are rigidly attached, across it in a straight line; the horizontal slot *k*, into and out of which the innermost section of the cutter is reciprocated, in the same manner and with the same effect as when said section is reciprocated into and out of the slot in the innermost guard-finger, and the projections *l l*, through which and the branches *d d* (which are parts of the frame) the axial bolt *e* is passed, connecting the shoe and frame together by one axis of motion, which is about at right angles to the finger-bar, instead of connecting said frame and shoe with two such axes, as were patented to Jacob Swartz in 1854, so that beside this shoe M being connected to the frame by a hinge-connection, as said Swartz had it, the outer end of the cutting apparatus, of which said shoe, the finger-bar N, and the narrow divider O form parts, may rise or fall within the limits allowed it without affecting or being affected by the height of this axis or the vertical position of the cutter's driving-wheel.

This shoe M, in addition to the features above enumerated, the combination of which forms its novelty as a part of the cutting apparatus, has the front end curved forward and upward, so as to pass over the cut grass without dragging it forward, and a transverse recess, N′, in which the inner end of the finger-bar N is confined by bolts, and the curved slot *m*, through which the clamping-bolt *n* is passed.

*q q q q q q q* are the guard-fingers, and O is the divider, each having a horizontal slot agreeing with the slot *k* in the shoe M when they are secured in proper position upon the finger-bar N, which is sustained and drawn forward by said shoe. The outer edge of this shoe, the inner and outer edge of each guard-finger, and the inner edge of the divider, above the horizontal slot, are about perpendicularly above the corresponding edges below this slot when the finger-bar is level, so that the crop will be held above and below the cutters about the same, and will therefore be severed when the cutter is too dull to sever it, if supported above or below only.

The divider O is attached at the outer end of the finger-bar N to divide the crop to be cut from that to be left standing, and to present an edge against which the outer section of the cutter severs a portion of the crop. Its forward end is pointed and slightly curved upward, so as to pass easily over the surface of the ground. The part below and the part above the cutters, and by which the crop is held thereto while being severed, are both of a less width than the distance between the centers of the fingers, as shown in Fig. 1, and for this reason this divider may be drawn into the uncut crop with less power applied, and the uncut crop be pressed down less before it is cut, than it would be were either of these parts of the divider as wide or wider than the distance between the centers of the fingers. Thereby, also, side draft is reduced or prevented entirely, and the grass cut against said divider is cut more nearly at an uniform height with that cut by the central portion of the cutting apparatus. For these reasons the divider O is called a "narrow" divider, and when hereinafter it is referred to it is to be understood as only including the description above written, unless otherwise specifically mentioned. We lay no claim to its invention as a separate mechanical device, because we are aware that as such it was well known; but we are not aware that a harvester's cutting apparatus ever existed prior to this invention which had the divider thereof as above described, or an equivalent thereof, and the finger-bar that supports it combined with the shoe M or an equivalent thereof, which has the guideway *i*, the horizontal slot *k*, and the projections *l l*, with the single axis *e* or an equivalent thereof passed through them, as described above, so that said finger-bar would have no other connection with the frame of the machine to which the shoe was connected than the connection derived through said shoe, and so that said divider would be free to rise and fall within the limits allowed it, with the undulations of the ground, vibrating upon the single axis of motion of this shoe, as this narrow divider O does upon the axis *e*, to whatever part of the machine this shoe M was connected.

If the horizontal slot in divider O, into which the cutter is reciprocated, were made to extend over the whole width of the divider it would be very liable to become obstructed with clogging matter carried into it by the cutter. That portion which forms the upper side of said slot is therefore made much narrower than that portion which forms the lower side thereof, and the cutter is thereby enabled to work much more freely than it would did this slot extend across the whole width of the divider; and the narrower this slot is horizontally the more freely the cutters will move within it.

*r r r r r r r r r* are the several sections of which the cutter is composed, rigidly secured to the cutter-bar *j*, and each the same length thereon as the distance between the centers of the fingers, and are reciprocated across the shoe M, fingers *q*, and divider O, and through their slots in straight lines.

The intermediate gearing and crank and pitman between the cutter-bar *j* and the cutter's driving-wheel D are not shown, as they may be of any of the kinds generally in use.

F is the coupling or supplementary frame, through which the shoe M at the inner end of the cutting apparatus receives its connection with the main frame of the machine, so that this shoe can be raised or lowered in respect to the main frame, and when so moved have its longitudinal distance from the plane of the cutter's driving-wheel varied correspondingly with that of the outer end of the cutter's driving-pitman, so that the fingers and cutters will remain in substantially the same position in respect to each other at whatever height they may be placed in respect to the main frame.

We do not wish to be understood as claiming that William Gage was the first to conceive the idea of connecting a harvester's cutting apparatus to the main frame of the machine in such a manner that the inner end could be raised or lowered in respect to the main frame while the outer end of said cutting apparatus remained at the same height, and when thus moved have the longitudinal distance between the inner end and the plane of the cutter's driving-wheel varied, as we are aware that he was not the first to conceive the idea of doing this; but we are not aware that the harvester's cutting apparatus, having the shoe M at the inner end of the finger-bar N and the narrow divider O at the outer end, was ever connected to the main frame in such a manner that the axis through the shoe could be raised or lowered in respect to the main frame while said main frame remained in the same position and while the divider remained at the same height, and when thus moved have its longitudinal distance from the plane of the cutter's driving-wheel varied. When, therefore, the coupling-frame F is hereinafter referred to we do not wish to be understood as limiting ourselves to the exact details of construction herein shown and now to be described.

The coupling or supplementary frame F is constructed of the front branch, $F^1$, and the rear branch, $F^2$, of wood and the cast plate G. These parts are connected together by the screw-bolts *f f*. From the lower side of G are extended the branches *d d*, through which the axial bolt *e* is passed, and also the clamping-bolt *n*. On the inner sides of $F^1$ and $F^2$, in line with the main frame-piece $B^1$, is a cast-iron plate, H, having lateral flanges above and below, and upon the inner face the tubular pivot I, projecting in a line about parallel with the plane of the cutter's driving-wheel. Upon these two pivots the coupling-frame is vibrated, and the axial line connecting them coincides with the axis of the two joint-bolts *g g*, which pass through the branches $F^1$ and $F^2$ and the tubular pivots I I into screw-nuts inserted in the side piece $B^1$ of the main frame, and bind the coupling-frame and main frame together. The rear pivot, I, with the joint-bolt *g* passing through it, is shown in Fig. 8. On the inner sides of both $F^1$ and $F^2$ is the cast piece J, opposite to the serrated portions of the cast pieces C C. On the outer sides of both $F^1$ and $F^2$ is the cast plate K, at each end of which is a head, the outer face of which is made about parallel with the axle of the wheel D. These faces of the plates K form seats for the joint-bolts *g g* at their outer ends, and seats for the screw-nuts of the binding-rod L at their inner ends, as will be seen in Fig. 1. The rod L passes through the ends of the branches $F^1$ and $F^2$ beyond the main frame of the machine, and when the screw-nut on one or the other end is tightened up the branches are drawn toward each other and clamped at their inner ends to the main frame. When the coupling-frame F has been adjusted so that the shoe M is at the desired height from the ground and the wheel D in proper vertical position, if either the joint-bolts *g g* or the long rod L be tightened up by means of their screw-nuts, the branches $F^1$ and $F^2$ are forcibly drawn toward the main frame, and the serrations in C C will mesh with the serrations in the plates J J, so that the outer end of the coupling-frame can then neither move up nor down upon the pivots I I, but the main frame and coupling-frame will be rigidly attached. If the rod L is used without tightening up the joint-bolts *g g*, then both branches must be adjusted before tightening the screw-nut on the rod L; and when the joint-bolts *g g* are tightened up to hold the coupling and main frame as placed, the binding-rod L may be tightened up as an additional security against the disabling of the machine by the accidental breaking or failure of either of the joint-bolts *g g*.

It is evident that the bolts *g g* and rod L act in the same direction and accomplish separately the same result, and are, therefore, merely accessory to each other.

The coupling-frame F is pivoted to the main frame, as will be observed, at two points, one in front and one in rear of the driving-wheel D. This permits a construction of this hinge-connection with the ends of the pivot as far apart as the entire length of the main frame, which would be manifestly impossible if both ends of said pivots were either in front or in rear of the axle of this wheel, and consequently a shorter and lighter main frame may be used.

Thus we have a union of the greatest power to resist lateral strain in the coupling-frame, which has no other axial connection with the main frame than that formed by the pivots I I, and the shortest main frame possible. This is evidently a great advantage in the coupling-frame, an improvement which does not depend upon the special form of the parts of which it is constructed, or those by which it is secured to the main frame. When, therefore, the tubular pivots I I are hereinafter referred to we do not wish to be understood as confining ourselves to the exact details of construction shown.

To limit the downward vibration of the outer end of the cutting apparatus in its vibration upon its axis of motion through the shoe when mowing, the upper and inner portions of the projections *l l* are made to strike against the under side of the plate G; and that this limitation may be more effectual, and the clamping-bolt *n* be farther removed from the axis *e*, these projections *l l* are extended some distance farther inward than the inner end of the finger-bar.

*m* is a slot in the inner edge of each of the projections *l l* of the shoe M, curved about the center line of the axle-bolt *e*, as shown in Fig. 2, which view also shows the serrations in the outer sides of the projections *l l*, which correspond with the serrations in the inner sides of the washers *o o*, one of which, with one of the screw-nuts *p p*, is placed upon each end of the clamping-bolt *n*, which passes through the slots *m* and through holes in the branches *d d*. When the nuts *p p* are tightened up the serrations of the washers *o o* are forced to mesh with the serrations of the projections *l l*, and thus the attendant is enabled to have the inner end of the cutting apparatus held at different heights, for reaping or moving the machine from place to place, or to have the outer end held above the ground while the inner end remains on it.

When the nuts *p p*, or either of them, are slackened upon the bolt *n*, the outer end of the cutting apparatus may move up and down within the limit of motion allowed it by the slot *m* and the plate G, to conform to the undulations of the ground over which it is being drawn.

P is the outer carrying grass or grain wheel, having its axle Q connected to the outer end of the finger-bar N by the arms R and S, which latter is an extension of the narrow divider O, and the screw-bolt and thumb-nut *s*, by which the arms R and S are confined together, as shown in Figs. 5 and 6, which figures also show the horizontal slot *t* in the front end of the arm R; and Fig. 7 shows the serrations in its outer side, by which said arms are caused to remain as placed when the thumb-nut *s* is screwed down tight, so that the attendant can have the outer end of the cutting apparatus carried by this wheel P, and maintained at the desired height.

*u* is the flange-plate which, as shown in Figs. 5 and 7, covers the wheel P, to prevent it from becoming entangled with the cut grass that might fall upon and hinder it from turning if not thus protected.

T is the track-clearer, to separate the cut from the uncut grass and clear a track for the shoe at the next round of the machine. The track-clearer T is made in the form of a slightly-twisted plow mold-board, and set at such angle to its line of forward movement as to remove the cut grass a short distance from that which is left standing to be cut at the next round. It is confined to the finger-bar N by having a set-screw passed through the slot *w* in its front end into the hole *v* in the finger-bar. (See Fig. 1.)

*x* is a set-screw, which passes through a slot in the curved flange-plate *z* into the flange-plate *u*, to confine this track-clearer T thereto, and at the desired angle to the arm R when the finger-bar is elevated, as shown in Fig. 7.

When it is desired to have the outer end of the finger-bar N held above the ground, as shown in Fig. 6, the screws *s v x* are loosened, the bar N raised, and the said screws again tightened up.

The outer end of the finger-bar N, with the narrow divider O secured thereto, though not carried by the wheel P when drawn forward, (while mowing,) is raised upon it when the machine is backed, or when the outer end of the cutting apparatus is run backward to turn it at the corners of the field. This effect is produced because, being in front of a line connecting the points of bearing upon the ground of the wheels D and P, the slightest rise of the front end of the main frame will cause all those parts of the machine which are in front of said lines to rise up also, and it always happens that the front of the main frame is raised up when the horses are forcing the machine to move backward.

By having the outer end of the cutting apparatus thus raised up the horses are relieved while backing the machine, because there is less friction in carrying this end backward upon the wheel than in sliding it backward on the ground; and that the cutting apparatus may be more readily turned in at the corners, the rear end of the arm S is set a little inward, so that the axle Q will be more nearly parallel with said line of bearing between the wheels P and D.

When the machine is to be moved from place to place, and the outer end of the cutting apparatus carried by the wheel P, it is best to place said wheel at the end of the finger-bar, as shown in Fig. 7, so as to receive its weight in the most direct manner.

What is claimed under this patent as the invention of WILLIAM GAGE is—

1. The harvester's cutting apparatus having the shoe M, the finger-bar N, and the narrow divider O, or their equivalents, constructed and combined, substantially as herein described, so that this cutting apparatus will have one axis of motion between said shoe and the frame of the machine to which said shoe is connected, upon which the outer end of said cutting apparatus may rise or fall, within the limits allowed it, with the undulations of the ground over which it is drawn without affecting or being affected by the height of said axis or the vertical position of the cutter's driving-wheel.

2. The combination of the herein-described shoe M, finger-bar N, and narrow divider O, or their equivalents, in the harvester's cutting apparatus, when one of these portions of said divider, which supports the crop while being cut, is of less width than the other, substantially as and for the purpose set forth.

3. The combination of the shoe M, finger-bar N, and narrow divider O, or their equivalents, in the harvester's cutting apparatus, with the coupling-frame F, or an equivalent thereof, to enable the axis at the inner end of this cutting apparatus to be raised or lowered in respect to the main frame, substantially as and for the purpose described.

4. The combination of the coupling-frame F and the pivots I I, or their equivalents, with the main frame of the harvester, so as to have one portion or end of the hinge between these frames in front and one in the rear of the axle of the cutter's driving-wheel, substantially as and to obtain the advantages described.

5. The combinations of the inward projections *l l* and the plate G, or their equivalents, with the shoe M, finger-bar N, and the narrow divider O, in the harvester's cutting apparatus, to limit the downward vibrations of the outer end of this cutting apparatus, substantially as described.

6. The combination of the slots *m m*, the bolt *n*, the washers *o o*, and the screw-nuts *p p*, or an equivalent arrangement of parts, with the shoe M, finger-bar N, and narrow divider O, in the harvester's cutting apparatus, to hold up the inner end of this cutting apparatus, substantially as and for the purpose set forth.

7. The combination of the track-clearer T, or its equivalent, with the shoe M, finger-bar N, and narrow divider O, in the harvester's cutting apparatus, so as to separate the grass cut by this apparatus from that which is to remain uncut, substantially as described.

8. The combination of the carrying-wheel P, or its equivalent, with the shoe M, finger-bar N, and narrow divider O, in the harvester's cutting apparatus, so as to carry the divider in one of the ways named, substantially as and for the purpose specified.

WILLIAM GAGE. [L. S.]
ANDREW WHITELEY. [L. S.]

Witnesses:
JOHN T. GARDNER,
WM. WILLSON.